United States Patent [19]

Slomnicki

[11] 4,434,771
[45] Mar. 6, 1984

[54] OZONE PRODUCTION SYSTEM

[76] Inventor: Israel Slomnicki, Rehovot Hess St. N=14, Rehovot, Israel

[21] Appl. No.: 349,364

[22] Filed: Feb. 16, 1982

Related U.S. Application Data

[63] Continuation-in-part of Ser. No. 198,769, Oct. 20, 1980, abandoned.

[51] Int. Cl.³ .................................... F02M 27/04
[52] U.S. Cl. ........................... 123/539; 123/536; 123/537
[58] Field of Search ............... 123/536, 537, 538, 539, 123/589

[56] References Cited

U.S. PATENT DOCUMENTS

| 1,333,836 | 3/1920 | Csanyi ........................ 123/539 |
| 1,391,630 | 9/1921 | Haler .......................... 123/539 |
| 4,036,186 | 7/1977 | Hattori ......................... 123/589 |
| 4,308,844 | 1/1982 | Persinger ....................... 123/539 |
| 4,347,825 | 9/1982 | Suzuki ......................... 123/536 |

FOREIGN PATENT DOCUMENTS

| 2508815 | 9/1976 | Fed. Rep. of Germany ...... 123/539 |
| 2904234 | 8/1980 | Fed. Rep. of Germany ...... 123/539 |
| 856324 | 6/1940 | France ............................. 123/536 |
| 1045058 | 11/1953 | France ............................. 123/539 |
| 52-44327 | 4/1977 | Japan .............................. 123/536 |
| 1194204 | 6/1970 | United Kingdom ............... 123/539 |

*Primary Examiner*—Ronald H. Lazarus
*Attorney, Agent, or Firm*—Browdy and Neimark

[57] ABSTRACT

An ozone production system for use with hydrocarbon fuel apparatus, such as internal combustion engines, to improve the efficiency of combustion and to limit ozone emissions in the exhaust. The system comprises electrode means for the production of ozone arranged in association with the air inlet of an hydrocarbon fuel apparatus, an ozone sensing means associated with the exhaust outlet of the hydrocarbon fuel apparatus, and control means operative in response to an output of the ozone sensing means for supplying electricity to the electrode means for producing ozone at a controlled rate so as to limit the ozone emissions at the exhaust outlet and so as to supply sufficient ozone for complete combustion of the hydrocarbon fuel.

10 Claims, 4 Drawing Figures

OZONE PRODUCTION SYSTEM

REFERENCE TO RELATED APPLICATIONS

This is a continuation-in-part of U.S. patent application Ser. No. 198,769, filed Oct. 20, 1980 now abandoned.

FIELD OF THE INVENTION

The present invention relates to internal combustion engines and more particularly to accessories for improving the operating efficiency thereof.

BACKGROUND OF THE INVENTION

It is well known that internal combustion engines, particularly automobile engines, do not provide full combustion of their hydrocarbon fuels. The result is fuel inefficiency and the release of carbon monoxide and other products of incomplete combustion of hydrocarbon fuel into the atmosphere, producing smog.

A major cause of incomplete combustion of fuel in internal combustion engines is the inavailability of sufficient oxidizing power in the air, resulting in incomplete oxidation of the fuel.

It has been proposed in U.S. Pat. Nos. 1,333,836 and 1,725,661 to provide ozone producing apparatus in association with the air intake of a carburetor of an internal combustion engine. The ozone, being a very efficient oxidizer, increases the efficiency and completeness of combustion of fuel in the engine.

Notwithstanding the above-mentioned proposals, it is not believed that there exists on the market today apparatus for providing ozone to the air intake of an internal combustion engine. The reason for the lack of success of the proposed apparatus is believed to be that the supply of ozone was uncontrollable resulting in the inevitable production of surplus ozone and its release into the atmosphere. Since ozone is poisonous and has deleterious effects on various materials, such release is unacceptable.

SUMMARY OF THE INVENTION

The present invention seeks to provide an ozone production system which overcomes the stated disadvantages of the prior art.

There is thus provided in accordance with an embodiment of the present invention an ozone production system including electrode apparatus arranged in association with the air intake of hydrocarbon fuel combustion apparatus; ozone sensing apparatus associated with the exhaust outlet of the hydrocarbon fuel combustion apparatus; and control apparatus operative in response to the output of the ozone sensing apparatus for supplying electricity to the electrode apparatus for producing ozone in a variable controlled quantity selected so as to limit the ozone emissions at the exhaust so as not to exceed a predetermined threshold.

Further in accordance with an embodiment of the present invention, there is provided an ozone production system for use with hydrocarbon fuel combustion apparatus having an air inlet and an exhaust outlet and comprising electrode apparatus arranged in association with the air inlet; and control apparatus responsive to the rate of combustion of the combustion apparatus for supplying electricity to the electrode apparatus for producing ozone in a variable controlled quantity corresponding to the rate of combustion.

Additionally in accordance with a preferred embodiment of the present invention, the control apparatus of the embodiment described just above is also responsive to the sensed presence of ozone at the exhaust outlet.

BRIEF DESCRIPTION OF THE DRAWINGS

The present invention will be more fully understood and appreciated from the following detailed description taken in conjunction with the drawings in which.

DETAILED DESCRIPTION OF THE INVENTION

Figure 1A:
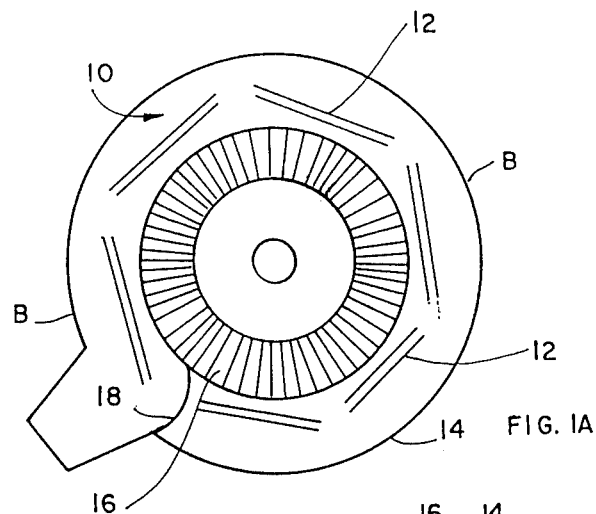
FIG. 1A and FIG. 1B are respective sectional illustrations of an arrangement of ozone producing electrodes adjacent an air filter, FIG. 1B being taken along the lines B—B of FIG. 1A.
Figure 1B:
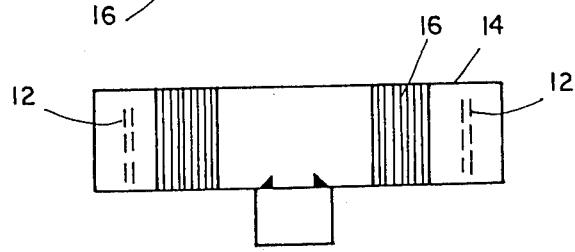
Figure 1C:
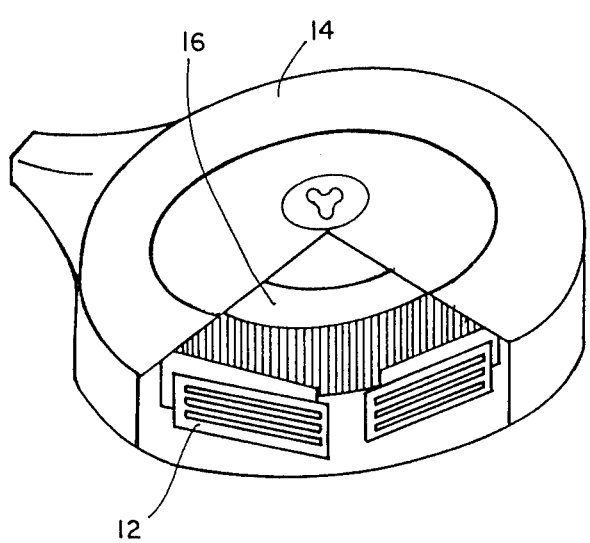
FIG. 1C is a partially cut away pictorial illustration of the apparatus of FIGS. 1A and 1B.

Reference is now made to FIGS. 1A, 1B and 1C which illustrate an array 10 of electrode pairs 12 arranged within an air-filter housing 14 so as to generally surround the air intakes to an air-filter 16. Typically, the electrode pairs comprise parallel copper strips having a dielectric coating so as to prevent sparking and arcing and to provide a silent discharge thereacross for producing ozone.

According to a preferred embodiment of the present invention, the individual electrodes forming each pair are separated by approximately 2–3 mm. Each pair is typically separated from adjacent pairs by 1–1½ cm. The interior of the air-filter housing 14 communicates with a carburetor (not shown).

Further according to a preferred embodiment of the invention, air-filter housing 14 is provided with a baffle 18 adjacent the air intake to force the air to circulate about the air-filter past all the electrode pairs 12.

Figure 2:
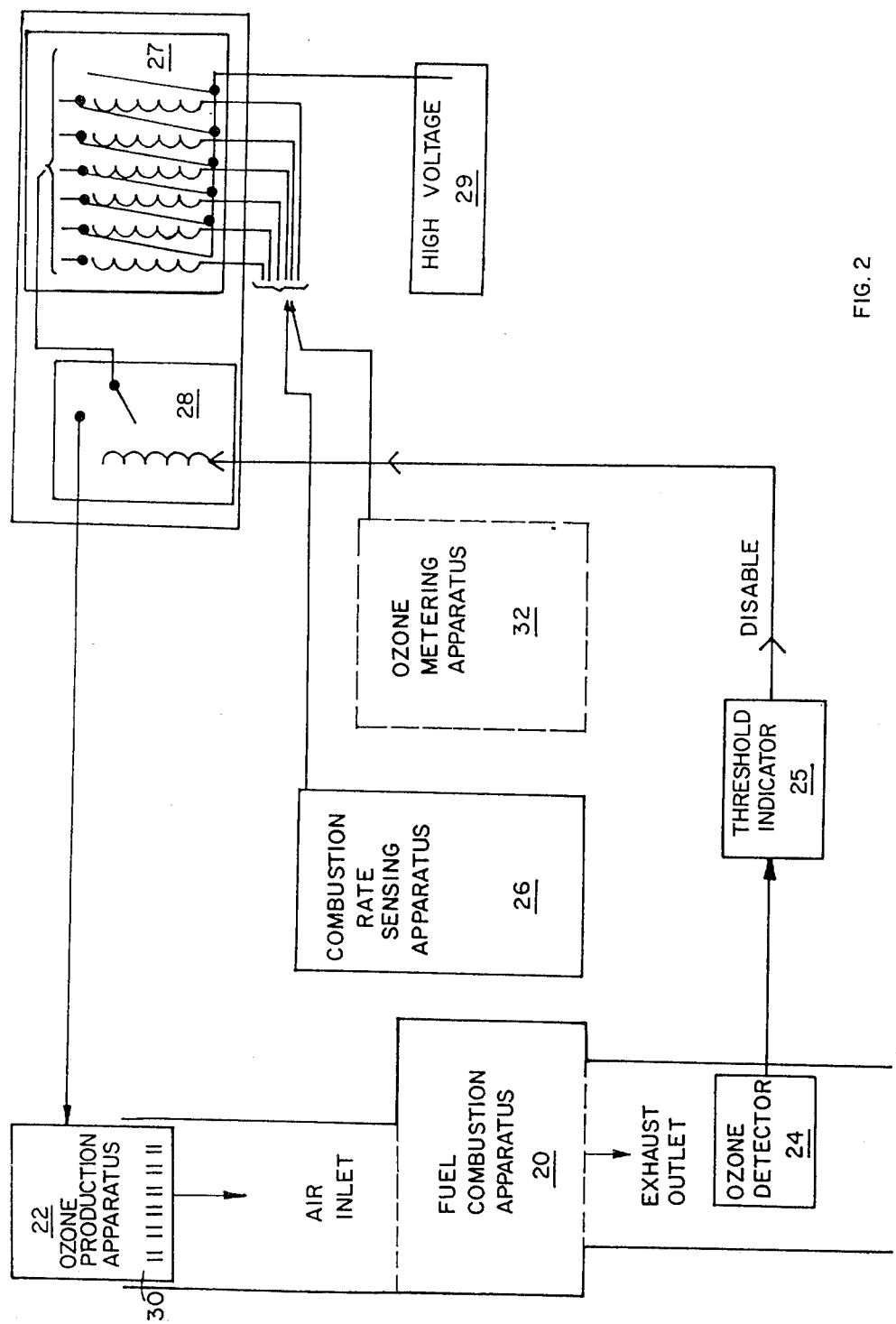
FIG. 2 is a block diagram illustration of an ozone production system constructed and operative in accordance with a preferred embodiment of the present invention.

An ozone production system suitable for use with hydrocarbon fuel combustion apparatus, such as fuel oil burners for heating and gasoline engines, will now be described in connection with FIG. 2. Hydrocarbon fuel combustion apparatus 20, typically an internal-combustion engine such as a gasoline engine but alternatively any other applicable type of combustion apparatus, defines an air intake and an exhaust outlet. Disposed in operative association with the air intake of hydrocarbon fuel combustion apparatus 20 is ozone producing apparatus 22, which is arranged so as to provide ozone $O_3$ to the intake air flow of the apparatus 20.

Disposed in operative association with the exhaust outlet of apparatus 20 is an ozone detector 24. Ozone detector 24 may comprise any suitable conventional ozone detector, for example apparatus for measuring absorption of visible light or ultraviolet radiation, which is characteristically absorbed by the presence of ozone. Detector 24 may provide qualitative or quantitative output indications.

The output of detector 24 is supplied to threshold indicator apparatus 25 of conventional construction, which is operative to provide an output indication of the exceedence of a predetermined threshold level for ozone presence in the exhaust. Ideally, no ozone at all should be present in the exhaust. Thus, in the preferred usage, the predetermined threshold will be zero.

Combustion rate sensing apparatus 26 is provided for determining the rate of combustion of fuel and oxygen by the fuel combustion apparatus 20. Apparatus 26 may comprise a fuel consumption metering device or any other suitable device for determining, in real time, the rate of combustion. The output of apparatus 26 is supplied to control circuitry comprising switching apparatus 27 and disable apparatus 28.

According to a preferred embodiment of the present invention, wherein apparatus 20 comprises an internal combustion engine such as a gasoline engine, apparatus 26 may comprise the distributor of the engine which produces electrical output pulses of periodicity proportional to the rate of fuel consumption. Electrical conductors coupled to the distributor of the engine provide sequentially pulsed electrical outputs to switching apparatus 27 which may comprise thyristor switches for supplying a high voltage output from a high voltage electrical source 29 to the electrode apparatus 22 in accordance with the pulsed sequential triggering provided by the engine distributor. It is appreciated that apparatus 26 is operative to provide an output indication that can be used to determine the desired rate of ozone production at the air inlet to the combustion apparatus 20. Alternatively, apparatus 26 may comprise an electric motor operated distributor separate from the distributor of the engine and operated in parallel with the engine distributor.

Disable apparatus 28 receives the outputs from threshold indicator 25 and switching apparatus 27 and is operative to provide a high voltage electrical supply to electrodes 30 within ozone production apparatus 22. The input from indicator 25 operates as a disable switch for preventing the provision of an electrical supply to the ozone producing electrodes 30 so long as the threshold established by apparatus 25 is being exceeded. Ozone production apparatus 22 may comprise any suitable type and arrangement of electrodes 30 arranged to provide ozone to apparatus 20. According to a preferred embodiment of the invention, ozone production apparatus 22 comprises an arrangement of electrodes similar to that shown in FIGS. 1A–1C.

Control apparatus may comprise any suitable apparatus for providing a suitable electrical supply to the electrodes to provide an ozone production rate which maximizes the efficiency of combustion but without producing an excess ozone emission above the predetermined threshold established by apparatus 25.

According to an alternative embodiment of the present invention, when the rate of consumption is constant, sensing apparatus 26 may be replaced by ozone metering apparatus 32 which provides a preset periodic output to control apparatus 28 in accordance with a manually settable control. Apparatus 32 may typically comprise an electric motor operated distributor having a plurality of poles, each corresponding to a pair of electrodes, thereby providing actuation of the poles in a sequenced periodic manner.

It will be appreciated by persons skilled in the art that the present invention is not limited by what has been particularly shown and described hereinabove. Rather the scope of the present invention is defined only by the claims which follow:

I claim:

1. An ozone production system for use with hydrocarbon fuel combustion apparatus having an air inlet and an exhaust outlet, said system comprising:
   a plurality of electrode pairs arranged in association with said air inlet;
   radiation absorption sensing means associated with said exhaust outlet and arranged to detect and indicate the presence of ozone;
   distributor means for sensing the rate of combustion of said combustion apparatus and providing a plurality of sequenced pulsed outputs; and
   control means operative in response to said sequenced pulsed outputs and to an output of said radiation absorption sensing means for governing the supply of electricity to said electrode means for producing ozone at a controlled rate so as to limit the ozone emissions at said exhaust outlet.

2. An ozone production system according to claim 1 and wherein said radiation absorption sensing means comprises a radiation emission means and a radiation detector.

3. An ozone production system according to claim 1 and wherein said radiation absorption sensing means comprises an ultraviolet emission lamp and an ultraviolet ray detector.

4. An ozone production system according to claim 1 and wherein said control apparatus includes means operative to govern the supply of electricity to said electrode means so as to supply sufficient ozone for complete combustion of the hydrocarbon fuel and limit the ozone emissions at said exhaust outlet so as not to exceed a predetermined threshold.

5. An ozone production system for use with hydrocarbon fuel combustion apparatus having an air inlet and an exhaust outlet, said system comprising:
   electrode means arranged in association with said air inlet;
   ozone sensing means associated with said exhaust outlet;
   means for sensing the rate of combustion of said combustion apparatus and providing an output indication corresponding thereto; and
   control means operative in response to an output of said ozone sensing means and said output indication of said rate sensing means for supplying electricity to said electrode means for producing ozone at a controlled rate so as to limit the ozone emissions at said exhaust outlet.

6. An ozone production system according to claim 5 and wherein said ozone sensing means comprises radiation absorption sensing means arranged to detect and indicate the presence of ozone.

7. An ozone production system according to claim 5 and wherein said means for sensing the rate of combustion comprises distributor means providing a plurality of sequenced pulsed outputs.

8. An ozone production system according to claim 7 and wherein said electrode means comprises a plurality of electrode pairs, each receiving one of said plurality of sequenced pulsed outputs.

9. An ozone production system according to claim 5 and wherein said control means comprises an enable switch which is opened in response to an output from said ozone sensing means indicating ozone emissions at said exhaust outlet over a predetermined threshold.

10. An ozone production system according to claim 9 and wherein said ozone sensing means includes threshold determining means for determining said predetermined threshold and indicating exceedance thereof to said control means.

* * * * *